Patented Aug. 5, 1941

2,251,519

UNITED STATES PATENT OFFICE 2,251,519

PROCESS FOR MAKING POLYMERIC MATERIALS

Robert M. Joyce, Wilmington, and David M. Ritter, Claymont, Del., assignors to E. I. du Pont de Nemours & Company, Wilmington, Del., a corporation of Delaware No Drawing. Application February 7, 1939, Serial No. 255,164

20 Claims. (Cl. 260—2)

This invention relates to polymeric materials and more particularly to an improved method for the catalytic conversion of cyclic amides into fiber-forming polyamides.

The catalytic conversion of cyclic amides into polymers as heretofore proposed has been unsatisfactory from the standpoint of the quality of the polymers obtained and from the standpoint of the efficiency of the catalytic material used. Thus although certain metallic halides will catalyze the conversion of cyclic amides to polymers, the resulting products are dark colored and have poor fiber-forming properties. Some materials, such as sodium amide, exhibit some catalytic action but are relatively inefficient as compared to the catalytic materials used in the process of this invention. Most other sodium compounds, and in general the alkali and alkali earth hydroxides are, insofar as is known, wholly inoperative. Another method consists in adding to the cyclic amide, epsilon-caprolactam, an agent such as water which is known to be an amide-splitting agent. This method, however, requires longer periods of time to effect a satisfactory degree of polymerization.

This invention has as an object an improved catalytic process for the conversion of cyclic amides to polymers. A further object is a process of this kind characterized by rapid conversion of cyclic amides to polymers and by the production of light-colored fiber-forming polyamides. Other objects will appear hereinafter.

The above objects are accomplished by a process involving heating a cyclic amide with metallic sodium or with any of the alkali or alkali earth metals.

The best method for carrying out our invention consists in heating the cyclic amide, preferably epsilon-caprolactam, with about $\frac{1}{200}$ mole of sodium metal per mole of cyclic amide at a temperature of 100–150° C. in an inert atmosphere to bring about an initial reaction between the metal and an equimolecular amount of the lactam. When this initial reaction is complete the temperature is then raised to about 230–250° C. and maintained for about one-half to two hours to bring about polymerization. In order to obtain light-colored polymers, the first stage of the reaction must be carried out at a relatively low temperature because if the reaction becomes too violent, charring will ensue and a dark polymer will be formed. Although the reaction carried out in this manner involves two steps, it may be viewed as consisting of one essential step, namely, heating at polymerizing temperature the cyclic amide and an initial reaction product of the cyclic amide and sodium.

The reaction may be carried out to advantage in the presence of a small quantity of a viscosity stabilizer, which serves to limit the chain length of the polymer molecules. Compounds capable of functioning in this capacity include amides, primary amines, diamides, di-primary amines, and alkali metal salts such as sodium acetate. Polymers prepared in the presence of such stabilizers show enhanced resistance to viscosity alteration on heating.

The following examples are illustrative of the methods used in practicing our invention:

Example I

To 13.4 g. of epsilon-caprolactam in a tube was added 0.012 g. of sodium metal ($\frac{1}{227}$ mole per mole of epsilon-caprolactam); the tube was evacuated to 5 mm. to provide a sufficiently inert atmosphere, and heated to 120–150° C. until all the sodium had reacted. The tube was then heated to 240° C. for 45 minutes, when the melt had become too viscous to flow. The resulting polymer was hard, tough, and white and had an intrinsic viscosity of 0.60.

Example II

To a tube containing 7.6 g. of epsilon-caprolactam was added 0.0097 g. of sodium metal ($\frac{1}{160}$ mole per mole of epsilon-caprolactam); the tube was flushed with oxygen-free nitrogen, sealed, and heated to 100° C. to allow the sodium to react. The tube was then heated to 250° C. for 1½ hours. The resulting polymer was hard, tough, and white.

Example III

A sealed, evacuated tube containing epsilon-caprolactam and $\frac{1}{124}$ mole of lithium metal per mole of epsilon-caprolactam was heated to 250° C. for ½ hour. The resulting polymer was very hard, tough, and light colored.

Example IV

A sealed, evacuated tube containing epsilon-caprolactam and $\frac{1}{54}$ mole of calcium metal per mole of epsilon-caprolactam was heated to 250° C. for 2 hours. The resulting polymer was white, hard and somewhat brittle.

Example V

To 28.8 g. of epsilon-caprolactam in a tube was added 0.039 g. of sodium metal ($\frac{1}{150}$ mole per mole of epsilon-caprolactam) and 0.01 g. of acetamide ($\frac{1}{150}$ mole per mole of epsilon-caprolactam). The tube was evacuated to 5 mm. and sealed. It was heated to 120–150° C. until the sodium had reacted, and then heated at 240° C. for 1 hour. The resulting polymer was white, hard, and tough; it had an intrinsic viscosity of 0.57.

Example VI

The lactam prepared by rearrangement of p-methyl cyclohevanone oxime with sulfuric acid was allowed to react with a small quantity of sodium metal, then heated to 250° C. for 2 hours. The resulting polymer was a hard, clear solid.

Example VII

The lactam prepared by rearrangement of cyclooctanone oxime with sulfuric acid was allowed to react with a small quantity of sodium metal, then heated to 250° C. for 1 hour in a sealed, evacuated tube. There resulted a hard, tough, light-colored polymer.

Example VIII

A mixture of 4.5 g. of epsilon-caprolactam and 0.5 g. of monomeric (cyclic) hexamethylene azelate was heated with 0.007 g. of sodium metal at 120° C. for ½ hour. This gave a very viscous melt. Polymerization was completed by heating the melt at 240° C. for 1 hour. There resulted a tough, opaque interpolymer with a softening point of 136°.

Example IX

A mixture of 2 g. of 3-methylcyclohexanone isoxime and 8 g. of epsilon-caprolactam was allowed to react with 0.015 g. of sodium metal in a sealed evacuated tube at 120° C., and then polymerized by heating at 250° C. The melt became very viscous after 4-5 hours. Heating was continued for 50 hours. There was obtained a tough, white interpolymer melting at 175°; its intrinsic viscosity was 0.54.

Example X

A mixture of 4.5 of epsilon-caprolactam and 0.5 g. of omega-hydroxytetradecanoic lactone was allowed to react with 0.007 g. of sodium metal at 120° C.; the mixture was maintained at this temperature for ½ hour, during which time it became very viscous. Polymerization was completed by heating for one hour at 240° C. The resultant amide-ester interpolymer was a hard, tough, opaque solid with a softening point of 170°.

Sodium metal is preferably used as a catalyst because of its availability and low cost. The new process described herein, however, may be carried out with metals of subgroup A of groups I and II of the periodic table.

Small amounts of catalysts serve to bring about the polymerization. The reaction proceeds smoothly in the presence of as little as $1/225$ mole of sodium metal per mole of cyclic amide. It is undesirable to use more than $1/50$ mole of catalyst per mole of cyclic amide since the polymers so prepared are brittle. The best results in the case of sodium metal are obtained by polymerizing the cyclic amide with the initial low-temperature sodium-cyclic amide product at temperatures of 200-250° C. for ½ to 2 hours. The preferred temperature will vary somewhat depending upon the time desired for carrying out the reaction and upon the particular cyclic amide being polymerized. At temperatures below 150° C. the reaction is usually too slow to be practical and temperatures above 300° C. are undesirable because of bubble formation in the polymer. The reaction may be carried out either in an inert atmosphere or in an evacuated system.

The process of this invention is applicable to cyclic amides containing more than 6 annular atoms, e. g. caprolactam (cyclohexanone isoxime), the methylcyclohexanone isoximes, cycloheptanone isoxime, cyclooctanone isoxime, cyclopentodecanone isoxime, and cyclohexadecanone isoxime. These isoximes or lactams can be obtained by the sulfuric acid rearrangement of the corresponding oximes. As examples of cyclic amides containing more than one amide group there may be mentioned monomeric (cyclic) hexamethylene adipamide (14 membered ring) and dimeric (cyclic) hexamethylene adipamide (28 membered ring). This invention is also applicable to mixtures of cyclic amides, e. g., a mixture of caprolactam and methyl caprolactam, or a mixture of caprolactam and monomeric cyclic hexamenthylene adipamide. The cyclic amides used are preferably those which are not heavily substituted since certain lactams which bear several substituents on the ring, such as the lactam obtained by rearrangement of menthone oxime, resemble 5- and 6-membered rings in having a marked tendency toward ring closure as opposed to intermolecular reaction once the ring is opened.

The polymers obtained by the present invention are characterized by their high melting points (209-211° C. in the case of caprolactam polymers), and by the fact that they can be formed into filaments which yield oriented fibers on the application of tensile stress in a solid state, e. g., "cold drawing." They are further characterized by their microsrystalline nature, as evidenced by the sharp melting point and X-ray diffraction patterns. In general, to obtain polymers capable of being formed into oriented fibers, the polymerization should be carried out to yield a polymer whose intrinsic viscosity is 0.4 or more. Intrinsic viscosity is defined as $$\frac{\text{Log}_e n_r}{C}$$

in which $n_r$ is the viscosity of a dilute (e. g., 0.5%) metacresol solution of the polymer divided by the viscosity of metacresol at the temperature of measurement and in the same units, and C is the concentration expressed in grams of polymer per 100 cc. of solution.

The polymers produced by the process of this invention resemble those prepared by heating amino acids or their derivatives or by heating cyclic amides in the presence of an agent capable of effecting hydrolysis or its equivalent. For example, the polymers prepared by heating epsilon-aminocaproic acid, by heating epsilon-caprolactam with water, or by heating epsilon-caprolactam with sodium are essentially indistinguishable and may all be hydrolyzed to epsilon-aminocaproic acid by hot, concentrated hydrochloric acid.

The polymers produced by the process of this invention are superior to those prepared from cyclic amides and amide-splitting agents with respect to the quantity of unreacted monomer remaining in the polymer when the polymerization has been carried to its practical limits. For example, polymers prepared from epsilon-caprolactam and sodium metal contain 4–6% residual epsilon-caprolactam; polymers prepared from epsilon-caprolactam in the presence of water contain 7–10% residual lactam when the polymerization becomes so slow as to have substantially ceased.

This invention is particularly useful in the preparation of linear polyamides which may be formed into filaments, films, molded compositions, coating compositions, etc.

The term "polyamide" as used herein also includes polyester-amides which are obtained by heating a mixture of a cyclic amide and a cyclic ester, such as hexamethylene azelate and epsilon-caprolactam (Example VIII); omega-hydroxytetradecanoic lactone and epsilon-caprolactam (Example X); caprolactone and caprolactam, omega - hydroxytetradecanoic lactone and 3-methyl cyclohexanone isoxime, by the process of this invention. Polyester-amides which are formed by heating polymeric cyclic esters with a cyclic amide, such as polyhexamethylene sebacate and epsilon-caprolactam are likewise included.

The present invention makes possible the preparation of polyamides with ease and economy of operation. The short time required to carry out the process is a distinct advantage over other processes for producing polyamides of the kind described herein. The present process is one which does not require the disposal of volatile by-products, and which does not, as in the case of some materials to which catalytic action has been attributed, depend upon the presence of water for satisfactory operativeness.

As many apparently widely different embodiments of this invention may be made without departing from the spirit and scope thereof, it is to be understood that we do not limit ourselves to the specific embodiments thereof except as defined in the appended claims.

We claim:

1. A process for making polymers from a cyclic amide which contains more than 6 annular atoms consisting of carbon atoms and of amido nitrogen atoms forming part of an amide grouping which is an integral part of the annular structure, said process comprising heating said amide at polymerizing temperature with an initial product obtained by heating said amide below said temperature with a small amount of a metal of the class consisting of alkali and alkali earth metals.

2. A process for making polymers from a cyclic amide which contains more than 6 annular atoms consisting of carbon atoms and of amido nitrogen atoms forming part of an amide grouping which is an integral part of the annular structure, said process comprising heating said amide at polymerizing temperature with an initial product obtained by heating said amide below said temperature with a small amount of a metal of the class consisting of alkali and alkali earth metals, and continuing said heating at polymerizing temperature until the polymer obtained is capable of being formed into filaments which can be cold drawn into useful pliable fibers.

3. A process for making polymers from a cyclic amide containing more than 6 annular atoms consisting of carbon atoms and of amido nitrogen atoms forming part of an amide grouping which is an integral part of the annular structure, said process comprising heating said amide at a temperature of 150° C. to 300° C. with an initial product obtained by heating said amide below said temperature with a small amount of metal of the class consisting of alkali and alkali earth metals, and continuing said first-mentioned heating until the polymer obtained is capable of being formed into filaments which can be cold drawn into useful pliable fibers.

4. A process for making polymers from a cyclic amide containing more than 6 annular atoms consisting of carbon atoms and of amido nitrogen atoms forming part of an amide grouping which is an integral part of the annular structure, said process comprising heating below polymerizing temperature said amide and a metal of the class consisting of alkali and alkali earth metals, and continuing the heating at polymerizing temperature.

5. A process for making polyamides from a cyclic amide containing more than 6 annular atoms consisting of carbon atoms and of amido nitrogen atoms forming part of an amide grouping which is an integral part of the annular structure, said process comprising heating below polymerizing temperature said amide and a metal of the class consisting of alkali and alkali earth metals, and continuing said heating at polymerizing temperature until the polymer obtained is capable of being formed into filaments which can be cold drawn into useful pliable fibers.

6. A process for making polymers from a cyclic amide containing more than 6 annular atoms consisting of carbon atoms and of amido nitrogen atoms forming part of an amide grouping which is an integral part of the annular structure, said process comprising heating said amide at a temperature of 100° C. to 150° C. with a small amount of a metal of the class consisting of alkali and alkali earth metals, and then continuing the heating at a temperature of 200° C. to 270° C. until the polymer obtained has an intrinsic viscosity of at least 0.4.

7. In a process for making polymers, the step comprising heating a cyclic amide containing more than 6 annular atoms, with a small amount of a metal of the class consisting of alkali and alkali earth metals, said cyclic amide consisting of carbon atoms and of amido nitrogen atoms forming part of an amide grouping which is an integral part of the annular structure.

8. The process set forth in claim 2 in which said cyclic amide is epsilon-caprolactam.

9. The process set forth in claim 3 in which said cyclic amide is epsilon-caprolactam.

10. The process set forth in claim 4 in which said cyclic amide is epsilon-caprolactam.

11. The process set forth in claim 6 in which said cyclic amide is epsilon-caprolactam.

12. The process set forth in claim 7 in which said cyclic amide is epsilon-caprolactam.

13. The process set forth in claim 2 in which said metal is sodium.

14. The process set forth in claim 3 in which said metal is sodium.

15. The process set forth in claim 4 in which said metal is sodium.

16. The process set forth in claim 6 in which said metal is sodium.

17. The process set forth in claim 7 in which said metal is sodium.

18. The process set forth in claim 1 in which said cyclic amide is epsilon-caprolactam and in which said metal is sodium.

19. The process set forth in claim 7 in which said cyclic amide is epsilon-caprolactam and in which said metal is sodium.

20. The process set forth in claim 1 in which said cyclic amide is epsilon-caprolactam and in which said metal is sodium and is present in amount based on the caprolactam of from $\frac{1}{225}$ mole to $\frac{1}{50}$ mole.

ROBERT M. JOYCE.
DAVID M. RITTER.

CERTIFICATE OF CORRECTION.

Patent No. 2,251,519.   August 5, 1941.

ROBERT M. JOYCE, ET AL.

It is hereby certified that error appears in the printed specification of the above numbered patent requiring correction as follows: Page 1, second column, line 59, Example VI, for "cyclohevanone" read --cyclohexanone--; page 2, first column, line 33, Example X, for "4.5" read --4.5 g.--; line 73, for the syllable "pentodecanone" read --pentadecanone--; same page, second column, line 10, for "hexamenthylene" read --hexamethylene--; line 26, for "microsrystalline" read --microcrystalline--; page 3, first column, line 60, claim 3, before "metal" insert --a--; and that the said Letters Patent should be read with this correction therein that the same may conform to the record of the case in the Patent Office.

Signed and sealed this 23rd day of September, A. D. 1941.

(Seal)

Henry Van Arsdale,
Acting Commissioner of Patents.